United States Patent [19]
Scherb

[11] Patent Number: 5,259,523
[45] Date of Patent: Nov. 9, 1993

[54] MODULAR ART WORK CARRIER

[76] Inventor: David A. Scherb, 800 Peninsula Rd., Hope, Id. 83836

[21] Appl. No.: 945,124

[22] Filed: Sep. 15, 1992

[51] Int. Cl.$^5$ .............................................. B61D 6/00
[52] U.S. Cl. .................. 220/4.26; 220/4.28; 206/449; 206/454; 206/583
[58] Field of Search .................... 220/4.28, 4.26, 4.27; 206/449, 454, 583

[56] References Cited

U.S. PATENT DOCUMENTS

| | | | |
|---|---|---|---|
| 1,950,118 | 3/1934 | Lifton | 220/4.26 |
| 2,203,890 | 4/1936 | Crampton | 41/4 |
| 3,251,460 | 5/1966 | Edmonds | 220/4.26 |
| 3,266,656 | 8/1966 | Kridle | 220/4 |
| 3,327,882 | 6/1967 | Andrews | 220/4.28 |
| 3,374,914 | 3/1968 | Adam | 220/4.28 |
| 3,401,814 | 9/1968 | Chiswell | 220/4 |
| 3,450,293 | 6/1969 | Seda et al. | 220/4.28 |
| 3,692,264 | 9/1972 | Burkhard et al. | 206/583 |
| 3,760,970 | 9/1973 | Lutz | 220/4.28 |
| 4,013,170 | 3/1977 | Hutterer | 206/583 |
| 4,061,224 | 12/1977 | Fuhri | 220/22 |
| 4,156,498 | 5/1979 | Miller | 224/45 |
| 4,446,968 | 5/1984 | Bremer | 206/451 |
| 4,471,869 | 9/1984 | Hasenfus | 206/1.7 |
| 4,664,254 | 5/1987 | Sitwell | 206/1.7 |
| 5,076,456 | 12/1991 | Geyer | 220/4.26 |

FOREIGN PATENT DOCUMENTS

| | | | |
|---|---|---|---|
| 305736 | 9/1968 | Sweden | 220/4.26 |
| 475299 | 11/1937 | United Kingdom | 206/521 |

*Primary Examiner*—Joseph Man-Fu Moy
*Attorney, Agent, or Firm*—William G. Forster

[57] ABSTRACT

A reusable, expandable art work carrier assembled from modular components, wherein the carrier can change in volume by the addition or subtraction of modules to accommodate and protect a wide range of works of art of various size and number during their storage or transport, yet remain completely enclosed for protective handling and transporting of framed works of art from external and internal forces. Included therein is a plurality of elongate planar sidewall modules connected end to end in series to form a closed loop therein defining a continuous sidewall unit of the carrier, and two opposing planar cover modules employed as a top cover and a bottom cover for the continuous sidewall thereby enclosing and covering the carrier. The art work carrier can expand to accommodate additional art works by adding one or more layers of similarly assembled continuous sidewall units, one atop the other, sandwiched between the opposing cover modules. The edges of each sidewall units assembled therein are configured to receive edges from a similar continuous sidewall unit layered atop to expand the carrier. In addition, the modules of the modular carrier are generally planar in shape thus, when not in use, the carrier can be broken down to its individual modules and stored substantially flat.

The sidewall modules that define the continuous sidewall unit are formed having a receiving end, and an opposite inserted end. The inserted end includes a laterally projecting edge, and the receiving end includes a slot, herein referred to as a channel in which to receive the projecting edge of the inserted end. The design of the sidewall modules is such that an inserted end so received by the receiving end is thus detachably connected thereto. Also included are transverse support members that engage the sidewall modules, spanning transversely from one sidewall module to an opposing sidewall module of a sidewall unit included therein. Thus, when transporting art work, the pieces are protected against movement by securing the same to the transverse support members. After the carrier is assembled, with the art work secured therein, the carrier components or modules are bound by exterior straps encircling the exterior surfaces to hold the same in close relationship. Beyond this, the container is typically manufactured from plastic by employing an ordinary vacuum form process to form the various parts of the container. Using this process, the sidewall modules are constructed by permanently joining two pieces of molded plastic. As a result, the sidewall modules have a double wall: an interior wall and an exterior wall. This, in turn, gives the sidewall modules added strength and durability.

19 Claims, 4 Drawing Sheets

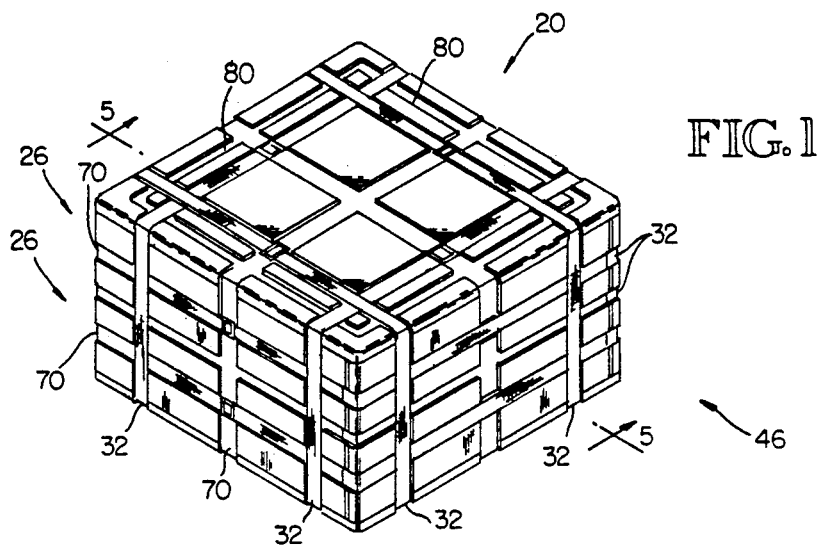
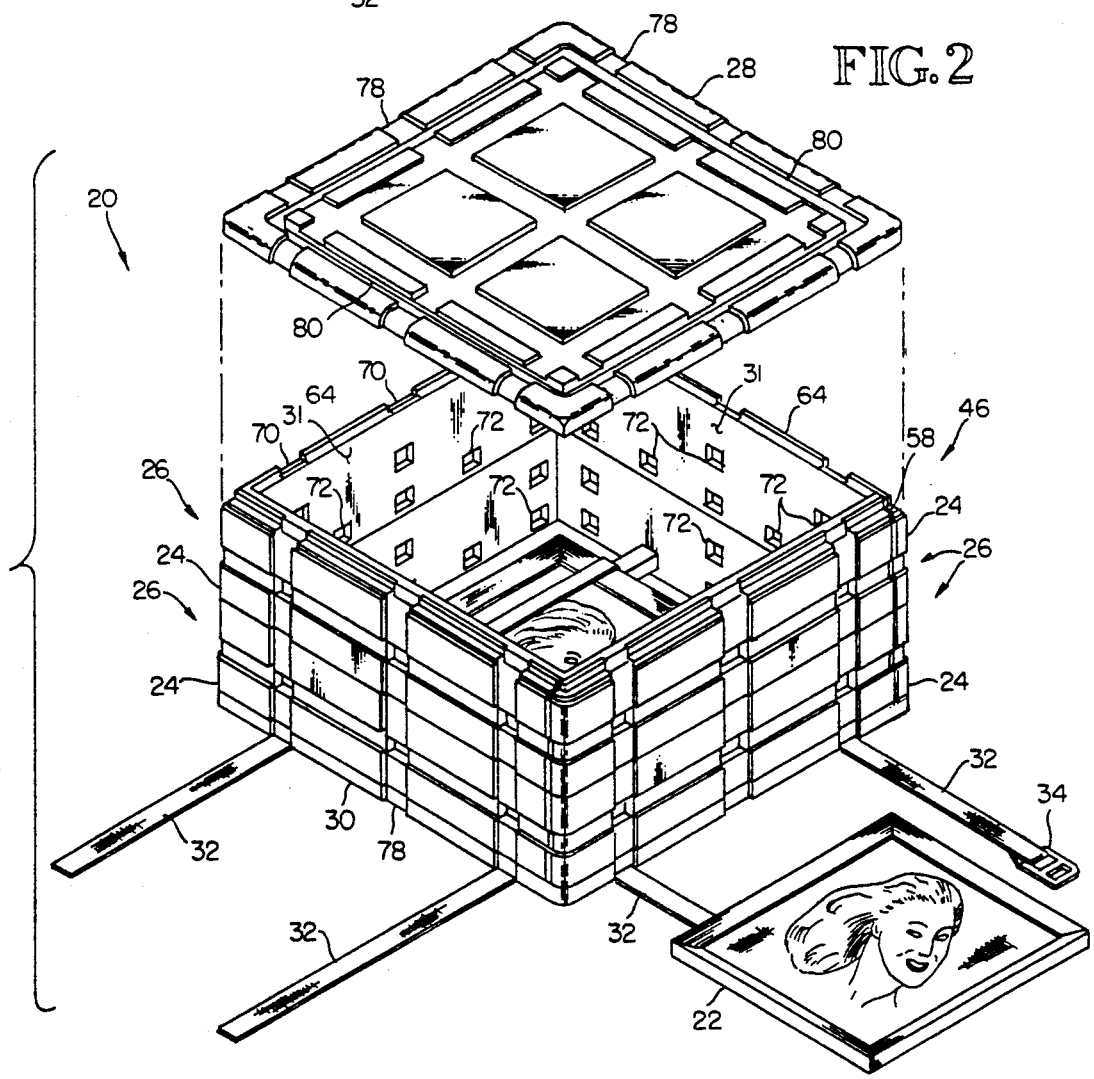

MODULAR ART WORK CARRIER

BACKGROUND OF THE INVENTION

This invention relates to reusable art work carriers for the transport of works of art, and more specifically to art work carriers that can change in volume to accommodate and protect a wide range of works of art of various size and number during their storage or transport, yet remain completely enclosed therein protecting the works of art from external and internal forces.

Artists, both professional and amateur alike, share the common problem of transporting art work from their studios to shows or exhibits, and commercial locations in a safe manner, without damage to the art work. Frequently, art work that must be transported includes pieces having widely varying dimensions. Moreover, the number of art pieces transported is often greater than ten thereby increasing the possibility of damage to the works of art and their frames during their transport. Accordingly, a number of carriers have been invented for the protective handling of works of art during their transport.

Several early designs incorporated mechanisms that simply separated the art work to prevent any touching between the pieces. These designs, however offered little assistance in handling numerous pieces of art work of widely varying sizes. Such designs were also limited by failing to address the problem of covering the art work to prevent damage from external forces. For example, U.S. Pat. No. 2,038,890 to Crampton discloses a simple unitary clip that is attached to two opposing canvases to separate them from each other. This design, however, is limited to protecting only two canvases of approximately the same size, and is not expandable to protect additional pieces. Further, it offers little protection from outside forces, and it cannot be used for canvases having any type of sizable frame.

Similarly U.S. Pat. No. 4,156,498 to Miller discloses a design that incorporates a number of rigid bars placed at longitudinally displaced points along the art work canvases or frames. The bars include adjustable fixed spacer members that extend inwardly between the frames to keep the frames separated. Because the bars are fixed in size, this design likewise limits the number of frames it can accommodate. Consequently the number of framed art pieces that it can transport is limited to the number of fixed spacer members that can fit on the rigid bars. Moreover, like Crampton, it offers little protection from outside forces, and can only secure pieces having similar dimensions.

Later designs like U.S. Pat. No. 4,446,968 to Bremer and U.S. Pat. No. 4,471,869 to Hasenfus offer more flexibility to accommodate works of art having varying dimensions. For example, Bremer discloses a carrier for unframed canvases that can expand to accommodate the size of the canvas. Included therein are cooperating panels that can adjust relative to one another to secure various sized canvases. The Bremer design, however, cannot expand in a way to accommodate a number of additional canvases, or canvases that include any sizable frame.

Similarly, Hasenfus discloses a carrier that can adjust to secure canvases of various size. This design includes internal, horizontally adjustable support clamps for preventing movement in a horizontal or vertical direction. Similar to Bremer, however, it cannot expand in a way to secure a large number of additional works of art. That is, the volume of the carrier, and the number of support clamps for securing the pieces is fixed. In contrast to the other designs noted above, however, Hasenfus provides cover against external forces that could damage the pieces during their transport.

Likewise, U.S. Pat. No. 4,061,244 to Fuhri also provides cover for secured pieces of art work of widely varying dimension by providing a case having a number of separate compartments which are adjustable in size and shape. However, like Hasenfus, it cannot expand in volume to accommodate a number of additional pieces of art work.

Subsequently, U.S. Pat. No. 4,664,254 to Sitwell was granted disclosing a completely enclosed container having a removable suspension system for transporting works of art of various dimension. Like the carriers that preceded it, however, the Sitwell carrier is limited to a fixed space for the placement of art work. Thus, in the same way, it cannot satisfy an artist's demand for a carrier that can expand in volume to suit his or her day-to-day use to accommodate art work of widely varying size and number.

Thus, the above noted carriers share the common problem of having a limited volume that cannot expand to accommodate the changing needs of an artist. Accordingly, a need remains for an expandable art work carrier that will allow an artist to ship or transport framed works of art in one relatively lightweight, enclosed container wherein the dimensions of the container can be changed therein providing the artist with the flexibility to vary the carrier's size and volume depending upon the largest piece being moved, and on the number of actual art pieces.

SUMMARY

One object of the present invention to provide an improved container for shipping framed works of art A second object is to simplify an artist's task of transporting numerous works of art of various size and shape.

A third object is to satisfy an artist's demand for a carrier that can change in volume to meet his or her changing individual day-to-day art work transportation needs.

A further object is to enclose pieces of art work during their transportation to protect the same from external forces.

Another object of the invention is to provide a lightweight, yet resilient carrier for works of art.

Still another object is to reduce the expense of carriers for the transport works of art.

Yet another object is to provide a carrier that can disassemble and fold relatively flat for ease of storage.

A further object of the invention is to produce a carrier that is easy to manufacture using common materials.

The invention is a modular carrier for art work, the carrier having multiple similar components, also referred to herein as modules, that assemble to completely enclose art work during the transportation or storage thereof. Due to its modular construction, the carrier can expand or contract in volume to meet the changing day-to-day needs of an artist for the protective handling and transporting of framed works of art of various size and number and the like. The carrier is reusable, lightweight, and inexpensive. Moreover, the modules of the modular carrier are generally planar in shape thus, when not in use, the carrier can be broken down to its individual modules and stored substantially flat.

Included therein are a plurality of elongate planar sidewall modules connected end-to-end in series to form a closed loop therein defining a continuous, stackable sidewall unit of the carrier. Also included are two opposing planar cover modules employed as a top cover and a bottom cover to detachably engage the continuous sidewall formed by the sidewall unit, thereby enclosing and covering the carrier. A modular art work carrier so formed defines a chamber in which to store and transport works of art.

The sidewall modules that define the continuous sidewall unit are formed having a receiving end, and a opposite inserted end. The inserted end includes a laterally projecting edge, and the receiving end includes a slot, herein referred to as a channel in which to receive the projecting edge of the inserted end. The design of the sidewall modules is such that an inserted end so received by the receiving end is thus detachably connected thereto.

To put it differently, the sidewall modules have two ends: a male end, and a female end. Wherein the male end of a sidewall module is received by the female end of an adjacently disposed sidewall module. In this way, a continuous sidewall unit is formed by a series of sidewall modules detachably connected end-to-end. Wherein the series of sidewall modules include a first module, intermediary modules and a last module, the last module being received by the first module, therein forming a continuous sidewall unit In addition, adjacent modules detachably connect to form a 90 degree angle, i.e., adjacent modules are detachably connected in series, each being perpendicular to the another.

In a further aspect of the invention, the art work carrier can expand to accommodate additional pieces of art work by stacking the sidewall units, one atop another, therein creating one or more layers of similarly assembled continuous sidewall units, sandwiched between the opposing cover modules. Each additional layer of stacked sidewall units therein creating an expanded chamber in which to place additional art work.

To facilitate such stacking, each continuous sidewall unit assembled therein includes offset projecting upper and lower edges disposed to overlap or mate with the opposing upper or lower projecting edge of a similar continuous sidewall unit layered or stacked atop or below. In this way, stacked sidewall units, being placed in their respective stacked position, are restricted from relative movement. Accordingly, this stacked or layered configuration allows an artist to expand the volume of the carrier to a size that will accommodate a substantial number of works of art having varying sizes.

In accordance with another aspect of the invention, transverse support members engage the sidewall modules, spanning transversely from one sidewall module to an opposing sidewall module of a sidewall unit included therein. Thus, when transporting art work, the pieces are protected against movement by securing the same to the transverse support members. Such attachment can be accomplished by metal clips attached to the support member on opposite sides of the art work wherein an elastic strap is stretched from one clip, across the frame of the art work, connecting with the opposing clip. Alternately, the works can be secured by straps attached to the support members, wherein a strap is attached to a support member on either side of the frame, with the strap including buckles to tighten the same therein applying pressure to the frame against the support members.

After the carrier is assembled, with the art work secured therein, the carrier components or modules are bound by exterior straps encircling the exterior surfaces. The straps commonly have buckles that allow an artist to impart tension therein. In this way, the modules are held in position, thus preventing their disengagement with each other. Moreover, an artist can use such exterior straps as a handle to grip the carrier when moving it from place to place.

Beyond this, the container is typically manufactured from plastic by employing an ordinary vacuum form process to form the various parts of the container. Using this process, the sidewall modules are constructed by permanently joining two pieces of molded plastic. As a result, the sidewall modules have a double wall: an interior wall and an exterior wall. This, in turn, gives the sidewall modules added strength and durability.

The foregoing and other objects, features, and advantages of this invention will become more readily apparent from the following detailed description of a preferred embodiment which proceeds with reference to the accompanying drawings.

BRIEF DESCRIPTION OF THE DRAWINGS

FIG. 1 is a perspective view of a fully assembled modular art work carrier constructed in accordance with the present invention.

FIG. 2 is a perspective view of the modular art work carrier with the top removed to reveal framed artwork contained therein, and other art work being prepared for packing.

DETAILED DESCRIPTION OF PREFERRED EMBODIMENT

Figure 3:
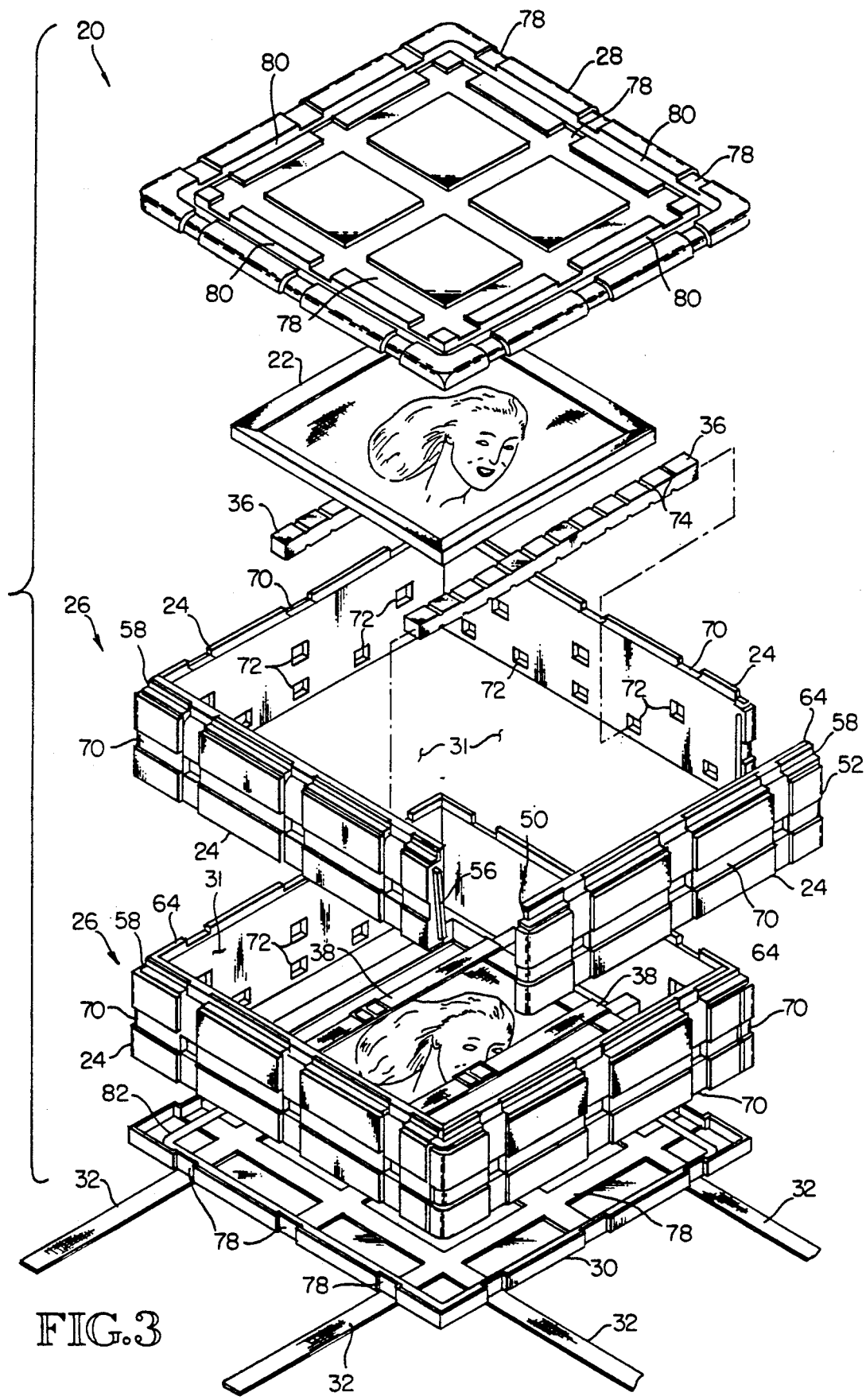
FIG. 3 is an exploded view of the modular carrier having framed works of art contained therein.
Figure 4:
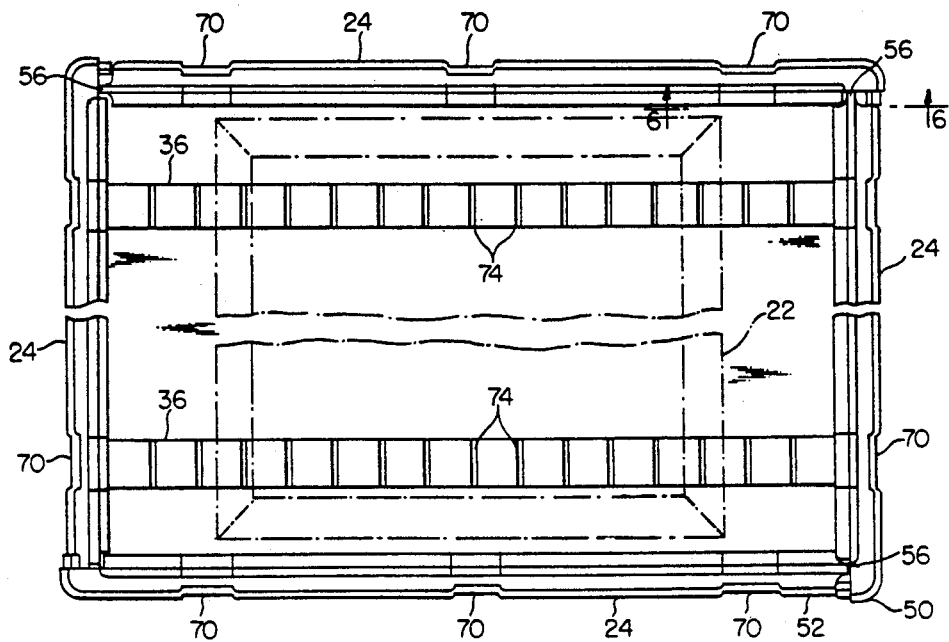
FIG. 4 is a plan view of the modular art work carrier with the top removed, the broken lines indicating like portions removed for illustrative purposes.

FIGS. 1 through 7 illustrate a preferred embodiment of the invention. The overall arrangement is first described with reference to FIGS. 1 through 3. Then, the various parts of the modular carrier are described with reference to the corresponding drawing Figures.

Indicated generally at 20 is a modular art work carrier for the protective handling of works of art 22. Included therein are a plurality of sidewall modules 24, connected end to end to form a continuous sidewall unit 26 of the carrier 20. In the preferred embodiment, the sidewall modules 24 are of matching size and construction, however, sidewall modules 24 having more than one size or configuration included therein could be utilized. Also included are top and bottom cover modules 28 and 30 disposed to engage the sidewall modules 24 to enclose the modular carrier 20 therein creating a chamber 31 for placement of works of art 22 therein.

In the assembled form, as illustrated in FIG. 1, the various modules of the carrier 20 are held in place by exterior straps 32 having a buckle 34. With the straps loosened as illustrated in FIG. 2, the top cover module 28 can be removed to prepare the carrier 20 to receive the art work 22. A carrier 20 so prepared includes a pair of transverse support members 36 that extend from one sidewall module 24 to an opposite sidewall module 24 of a sidewall unit 26. To secure the art work 22 from movement during transportation, the art work 22 is fastened to the transverse support members 36 by additional interior straps 38 having a buckle 40. Each end of the interior strap 38 having a loop or ring 42 that fits around a transverse support member 36, on each side of the art work, wherein an artist tightens the interior strap 38 to secure the art work 22 thereto.

Generally one pair of transverse support members 36 are employed in each sidewall unit 26. To accommodate additional art work 22, additional sidewall units 26 can be stacked, one atop the other, aligned to create one large chamber 31, therein forming an expanded sidewall system 46 having greater volume to accommodate additional works of art 22. Thus, a sidewall system 46 incorporates two or more sidewall units 26 stacked one atop the other. In this way, an artist can attach additional layers as required to accommodate works of art, i.e., sidewall units 26 can be added to the carrier 20 to expand its volume to adapt to the artist's personal needs. Accordingly, an artist can combine or stack as many sidewall units 26 as might be required to accommodate a number of various sized art works 22 that require transport or storage.

Considering in more detail the structure of the components from which the carrier 20 is assembled, the preferred embodiment includes sidewall modules 24, each constructed alike, generally planar, and rectangular in shape having two opposing ends, 50 and 52, wherein a male-female type connection is employed to join the sidewall modules 24 end-to-end to form a closed loop therein forming a sidewall unit 26. As will be more fully discussed below, in the preferred embodiment, each sidewall unit 26 incorporates four alike, i.e., interchangeable sidewall modules 24 therein connected end-to-end, the resulting sidewall unit 26 taking the shape of a square. Although in the preferred embodiment noted above the resulting sidewall unit is square shape, the sidewall modules could be sized to form a rectangular shape.

Figure 7:
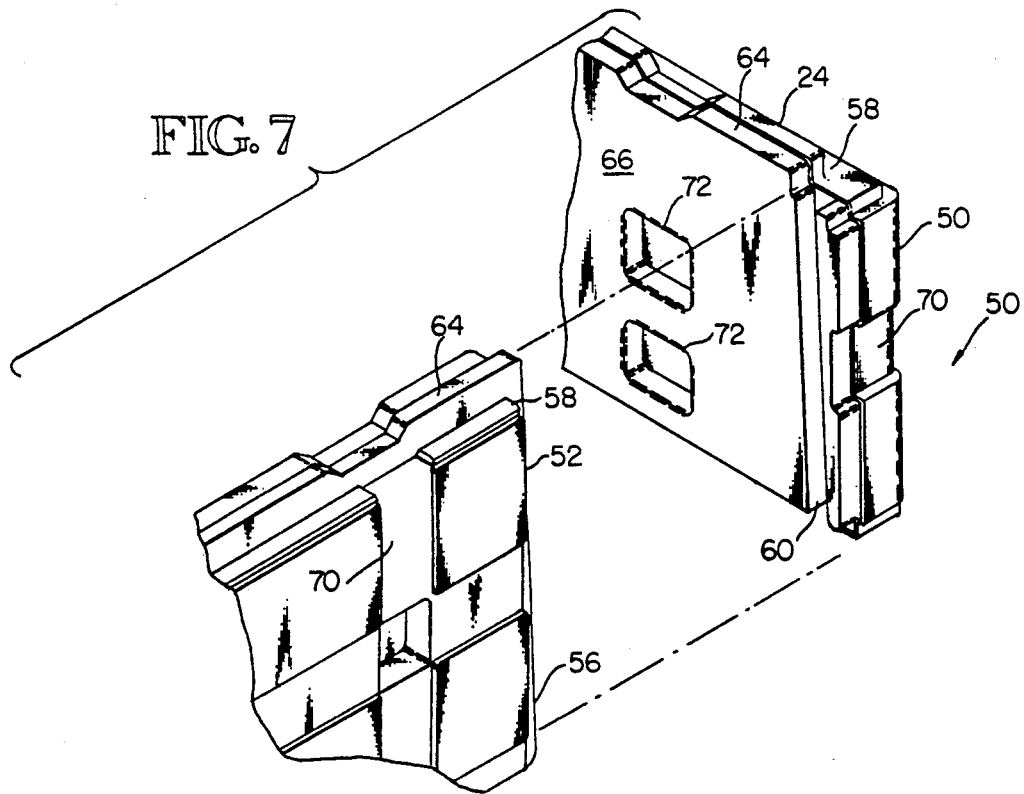
FIG. 7 is a partial perspective view of the connection joint between two sidewall modules of the preferred embodiment, wherein the receiving end and the inserted end are spaced apart.

More specifically, each sidewall module 24 includes a receiving end 50, and a inserted end 52, the receiving end 50 corresponding to the female side of the connection, and the inserted end 52 corresponding to the male side of the connection. As illustrated in FIG. 7, the inserted end 52 is formed having a projecting edge 56 that extends from the sidewall module 24, wherein a shoulder 58 is thus created. Accordingly, a channel 60 is formed in the receiving end 50 therein providing a slot or channel 60 to receive the projecting edge 56 of the inserted end 52. Because the sidewall modules 24 are constructed alike, the closed loop formed by the connected sidewall modules 24 is square in shape, the connection points being located at the corners of the sidewall unit 26, and incorporated therein.

Moreover, in the assembled form, the sidewall modules 24 are detachably connected end-to-end in series therein forming a closed loop having a square shape, wherein the projecting edge 56 is received into the channel 60 formed in the receiving end 50 thereby preventing relative lateral movement of the end-to-end connected sidewall modules 24 in one direction. In addition the channel 60 and the projecting edge 56 are formed to permit adjacent sidewall modules 24 to detachably connect therein forming a 90 degree angle. As such, the receiving end 50 of a sidewall module 24 includes a channel 60 formed to receive a projecting edge 56 that advances into the channel 60 at a right angle to the sidewall module 24. Accordingly, the projecting edge 56 of an adjacent module 24 is disposed to project in-line from the adjacent sidewall module 24.

As will later be more fully explained, the projecting edge 56 is prevented from, movement away from or out of the channel 60 by exterior straps 32 tightened against the exterior surface of the individual sidewall modules 24. In other words, each sidewall module 24 that is joined or connected to a similar sidewall module 24, is therein also prevented from relative movement normal to the other joining module by exterior straps 32 that extend and tighten around a sidewall unit 26 so formed.

Figure 6:
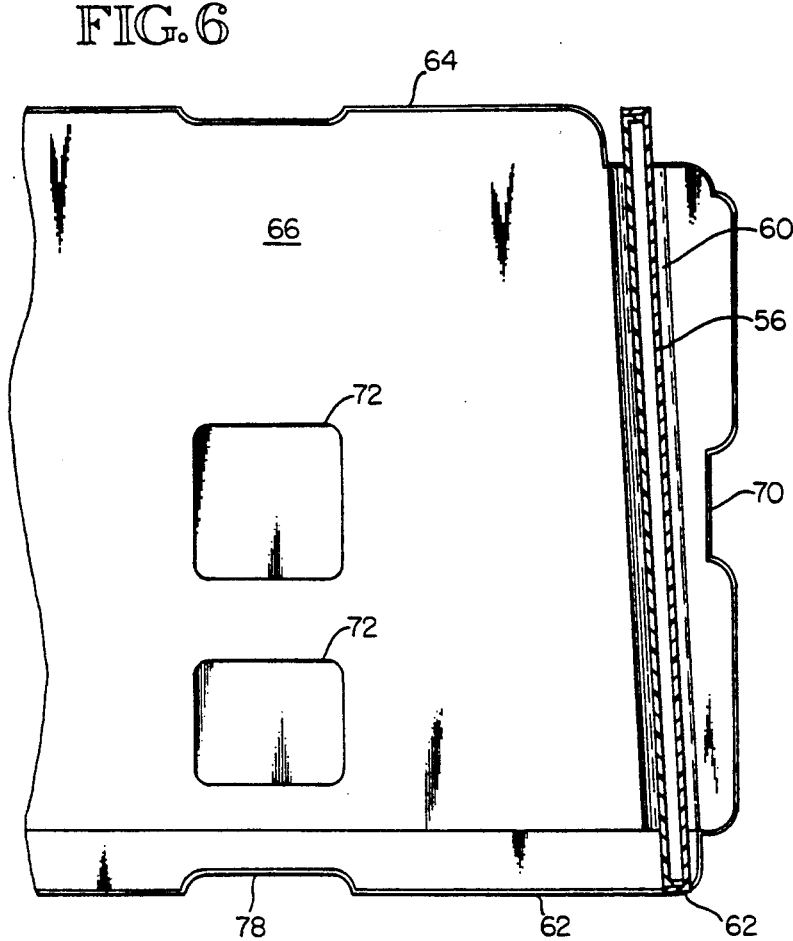
FIG. 6 is a partial vertical cross sectional view taken along line 6—6 to illustrate the receiving end of a module with the projecting edge of an inserted end in position.

Directing attention to FIG. 6, one can readily see that projecting edge 56, and similarly, the mating channel 60 of the sidewall modules 24 are inclined or slanted relative to an axis created by the closed loop formed therein. In this way, detachably connected sidewall modules 24 are likewise restricted from relative movement in the vertical direction as well as in the lateral direction. In addition, as will later be more fully discussed, channel 60 and projecting edge 56 are so inclined to provide a smooth transition from a top projecting edge 64 to an opposing, offset bottom projecting edge 62. As seen below, this construction is well suited to the method of manufacture of the preferred embodiment.

Figure 5:
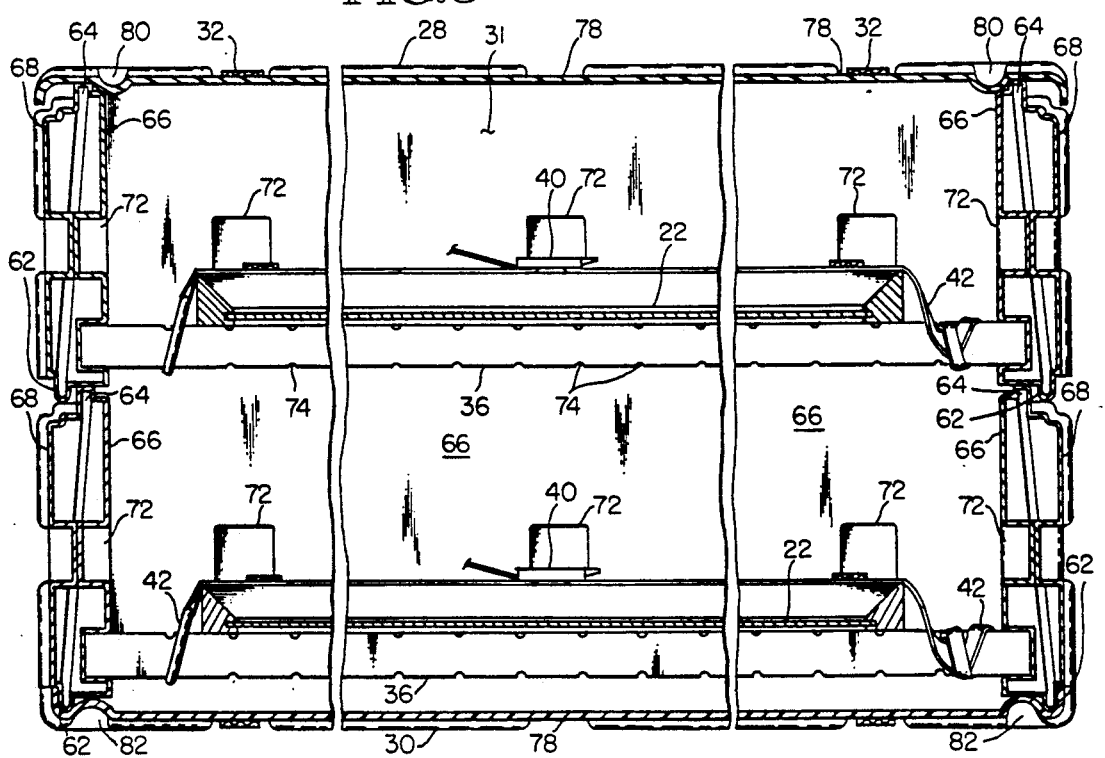
FIG. 5 is a vertical cross section of the modular art work carrier taken along line 5—5 illustrating the double wall construction of the present invention.

Turning now to FIG. 5, in the preferred embodiment of the invention, each sidewall module 24 is constructed from two pieces of precisely formed plastic that correspond to an inner wall 66 and an outer wall 68. The outer wall 68 is formed to have a slightly larger footprint, i.e., outline, than that of the inner wall 66. This allows the inner wall 66 to snugly fit into the outer wall 68. After the two pieces are so fitted, the inner wall 66 is then permanently fused to the outer wall 68 by the application of a solvent to their touching surfaces.

A conventional "Vacuum Form Process" is employed to form these parts into their final shape. The process begins with clamping a plastic sheet into a clamp frame. The clamp frame is then positioned under a heater that heats the sheet to forming temperature. The clamp frame is then positioned over the male mold and vacuum is applied. The formed part is then cooled by a fan or other method. The part is then removed from the mold and clamp frame, followed then by trimming to a finish size.

Thus, each sidewall module 24 includes an inner wall 66 and an outer wall 68, the combination therein forming a sidewall module 24 having double wall construction. This type of construction is particularly suited to sidewall modules 24 because of the resulting inherent properties. These including being extremely lightweight, yet very strong in bending, and in torsion due to its large moment of inertia.

Turning now to FIG. 5, a carrier 20 is illustrated having two sidewall units 24 stacked one atop the other to form a sidewall system 46. As stated above, an artist can combine or stack the sidewall units 26 to increase the size and volume of the carrier 20 to suit his or her individual needs. To facilitate such stacking, and to prevent relative lateral movement between the stacked sidewall units 26, each sidewall unit 26 incorporates top and bottom offset projecting edges 64 and 62. In this way, the top projecting edge 64 of a lower sidewall unit 26 overlaps the bottom projecting edge 62 of a sidewall unit 24 disposed above. In other words, the top projecting edge 64 of a lower positioned sidewall module 24, or sidewall unit 26 overlaps the bottom projecting edge of a upwardly positioned, sidewall module 24 or sidewall unit 26 that is thus stacked on top. As seen in FIG. 5, the top projecting edge 64 of a lower positioned sidewall module 24 is disposed closer to the interior chamber 31 than the bottom projecting edge 62 of an upwardly positioned sidewall module 24. This arrangement, however could be reversed and still maintain the advantage of overlapping edges.

Directing attention once again to FIG. 2, a top cover 28 and the bottom cover 30 are illustrated therein. Each being similarly molded by the vacuum form process, but having single wall construction rather than double wall construction like the sidewall modules 24. Because, an assembled sidewall system 46 includes a top projecting edge 64 offset from the bottom projecting edge 62, the top cover module 28 varies slightly in form from a bottom cover module 30.

More specifically, the top cover module 28 includes a continuous perimeter groove 80 disposed to engage the interior side of the top projecting edge 64 of a sidewall system 46 or sidewall unit 26. Similarly, the bottom cover module 30 includes a continuous perimeter groove 82 disposed to engage the interior side of the bottom projecting edge 62 of a sidewall system 46 or sidewall unit 26. In this way, the top and bottom covers 28 and 30 are restricted from lateral movement relative to the sidewall system 46 or, similarly, sidewall unit 24. In addition, the top and bottom cover modules 28-30 are removably mounted to either a sidewall unit 26 or a sidewall system 46 by straps 32 disposed to secure the same to the sidewall unit or system 26-46.

Turning again to FIG. 3, slots molded in the exterior surfaces are illustrated. Sidewall slots 70 and cover slots 78 are included therein to guide exterior straps 32 and restrict the same to a specific location on the carrier 20. As previously mentioned, exterior straps 32 so disposed restrict the modules from which the carrier 20 is constructed from disengaging. Thus, the straps serve two purposes: they hold the modules of the carrier 20 together, and they also serve as a grip for lifting and moving the carrier 20.

Returning again to FIG. 2, art works 22 are illustrated receiving support from a pair of transverse support members 36. The support members 36 are designed to span across a sidewall unit 26, from one sidewall module 24 to an opposite sidewall module 24. Like the sidewall modules 24, the transverse support members 36 are molded from two pieces of vacuum formed plastic. In this way, grooves 74 are easily formed thereon, to provide a means of attachment of wire clips (not shown) which can be stationed at the mid-point and the four corners of the art work to secure the same to the support members 36. Elastic bands (not shown) are attached to the clips and stretched across the framed piece to a clip similarly disposed on the opposite side thereby effectively securing the art work 22 against movement.

Alternatively, as discussed above, the art work 22 can be secured to the transverse support members 36 by interior straps 38 having a buckle 40 disposed between two rings that fit over the support members 36, one ring on either side of the art work 22. The art work 22 is, then secured to the support members 36 when the interior straps 38 are tightened therein creating tension to secure the art work 22 to the transverse support members 36.

Turning again to FIG. 2, numerous cavities 72 molded in the inner wall 66 of each sidewall module 24. are illustrated. The cavities 72 are disposed to form a symmetrical pattern that is repeated in each sidewall module 24. In this way, transverse support members 36 can span across a sidewall unit 26, from one sidewall module 24 to an opposing sidewall module 24; from one cavity 72 to an opposing cavity 72. Thus, a pair of transverse support members 36 can be positioned at multiple points in each layer, i.e., in each sidewall unit 26 of the carrier 20. Also, depending on the number of cavities 72 formed in each sidewall module 24, the transverse support members 36 can be laterally spaced apart to a distance that will give the art work 22 maximum support. Alternatively, transverse support rods 36 can be eliminated all together in any sidewall unit 26. to provide additional room for exceptionally large pieces of art work 22.

Having illustrated and described the principles of my invention in a preferred embodiment thereof, it should be readily apparent to those skilled in the art that the invention can be modified in arrangement and detail without departing from such principles. I claim all modifications coming within the spirit and scope of the accompanying claims.

I claim:

1. A modular art work carrier having a plurality of modular components arranged to protect works of art against damage from external or internal forces during transportation or storage thereof, wherein the carrier can be modified to accommodate and protect a variety of works of art of various sizes, the carrier comprising:

two opposing spaced-apart cover modules disposed to define two opposing surfaces of the carrier;

a plurality of sidewall modules disposed between the cover modules, each sidewall module having a receiving end and an opposite inserted end, wherein the sidewall modules detachable connect end-to-end in series to form a closed loop, the receiving end of each sidewall module receiving the inserted end of an adjacent sidewall module, and the inserted end of each sidewall module inserting into the receiving end of each sidewall module inserting into the receiving end of an adjacent sidewall module, wherein a closed loop so formed defines a sidewall unit, the two opposing cover modules being removably mounted to the sidewall unit so formed therein defining a chamber to place works of art for storage or transport;

a plurality of laterally spaced-apart transverse support members disposed within the carrier that span from one sidewall module to an opposing sidewall module to receive and secure art work against movement within the carrier; and a plurality of cavities formed in the sidewall modules therein defining a plurality of support points to receive the transverse support members, wherein a transverse support member so received is restrained against movement within the carrier.

2. A modular art work carrier as recited in claim 1 wherein the cavities formed in the sidewall modules are symmetrically disposed between the ends of the sidewall modules.

3. A modular art work carrier as recited in claim 1 wherein the sidewall modules comprise an inner wall joined to an outer wall therein forming a double wall construction.

4. A modular art work carrier as recited in claim 3 wherein the cavities formed in the sidewall modules are formed entirely in the inner wall.

5. A modular art work carrier as recited in claim 1 further comprising interior straps attached to the transverse support members that extend over the works of art to secure the works of art thereto.

6. A modular art work carrier as recited in claim 5 wherein the transverse support members include grooves formed therein to assist attachment of the interior straps thereto.

7. A modular art work carrier as recited in claim 1 wherein at least one sidewall unit is releasably engaged with at least one other adjacent sidewall unit to form a sidewall system having an expanded chamber to accommodate additional works of art.

8. A modular art work carrier as recited in claim 7 wherein each sidewall unit included therein further comprises a top projecting edge and an opposing bottom projecting edge, the top and bottom projecting edges disposed to allow releasable engagement between adjacent sidewall units.

9. A modular art work carrier as recited in claim 8 wherein each opposing spaced-apart cover module includes a perimeter groove disposed to engage a projecting edge of a sidewall unit.

10. A modular art work carrier as recited in claim 9 wherein the top projecting edge of a sidewall unit is disposed to overlap the bottom projecting edge of an adjacent sidewall unit therein restricting relative lateral movement between adjacent sidewall units that are so engaged.

11. A modular art work carrier as recited in claim 1 wherein the receiving end of a sidewall module is defined by a channel formed therein, and the inserted end of a sidewall module is defined by a projecting edge.

12. A modular art work carrier as recited in claim 11 wherein the channel of each receiving end, and the projecting edge of each inserted end is inclined therein restricting relative vertical movement between adjacent, detachably connected, sidewall modules.

13. A modular art work carrier as recited in claim 1 further comprising a plurality of exterior straps tightened against the outer surfaces of the carrier that restricts relative movement between the components thereof.

14. A modular art work carrier having a plurality of modular components arranged to protect works of art against damage from external or internal forces during transportation or storage thereof, wherein the carrier can be modified to accommodate and protect a variety of works of art of various sizes, the carrier comprising:
   two opposing spaced-apart cover modules disposed to define two opposing surfaces of the carrier;
   a plurality of sidewall modules disposed between the cover modules, each sidewall module having an inserted end defined by a projecting edge, and an opposing receiving end defined by a channel, wherein the sidewall modules detachable connect end-to end in series to form a closed loop therein defining a sidewall unit, the receiving end of each sidewall module receiving the inserted end of an adjacent sidewall module, and the inserted end of each sidewall module inserting into the receiving end of an adjacent sidewall module, and
   wherein the channel of each receiving end, and the projecting edge of each inserted end is inclined therein further restricting relative vertical movement between adjacent, detachable connected, sidewall modules.

15. A modular art work carrier as recited in claim 14 wherein the sidewall modules comprise an inner wall joined to an outer wall therein forming a double wall construction.

16. A modular art work carrier as recited in claim 15 further comprising a plurality of laterally spaced-apart transverse support members disposed within the carrier that span from one sidewall module to an opposing sidewall module to receive and secure art work against movement within the carrier; and
   a plurality of cavities formed in the inner wall of the sidewall modules to receive the transverse support members therein fixing the same against movement within the carrier.

17. A modular art work carrier as recited in claim 14 comprising at least two sidewall units releasably engaged to form a sidewall system having an expanded chamber to accommodate additional works of art, wherein each sidewall unit further comprises a top projecting edge and an opposing bottom projecting edge, the top projecting edge of a sidewall unit being disposed to overlap the bottom projecting edge of an adjacent sidewall unit to allow releasable engagement between sidewall units, while also restricting relative lateral movement between adjacent sidewall units that are so engaged.

18. A modular art work carrier as recited in claim 14 wherein each opposing spaced-apart cover module includes a perimeter groove disposed to engage a projecting edge of a sidewall unit.

19. A modular art work carrier as recited in claim 14 further comprising a plurality of exterior straps tightened against the outer surfaces of the carrier that restricts relative movement between the components thereof.

* * * * *